UNITED STATES PATENT OFFICE.

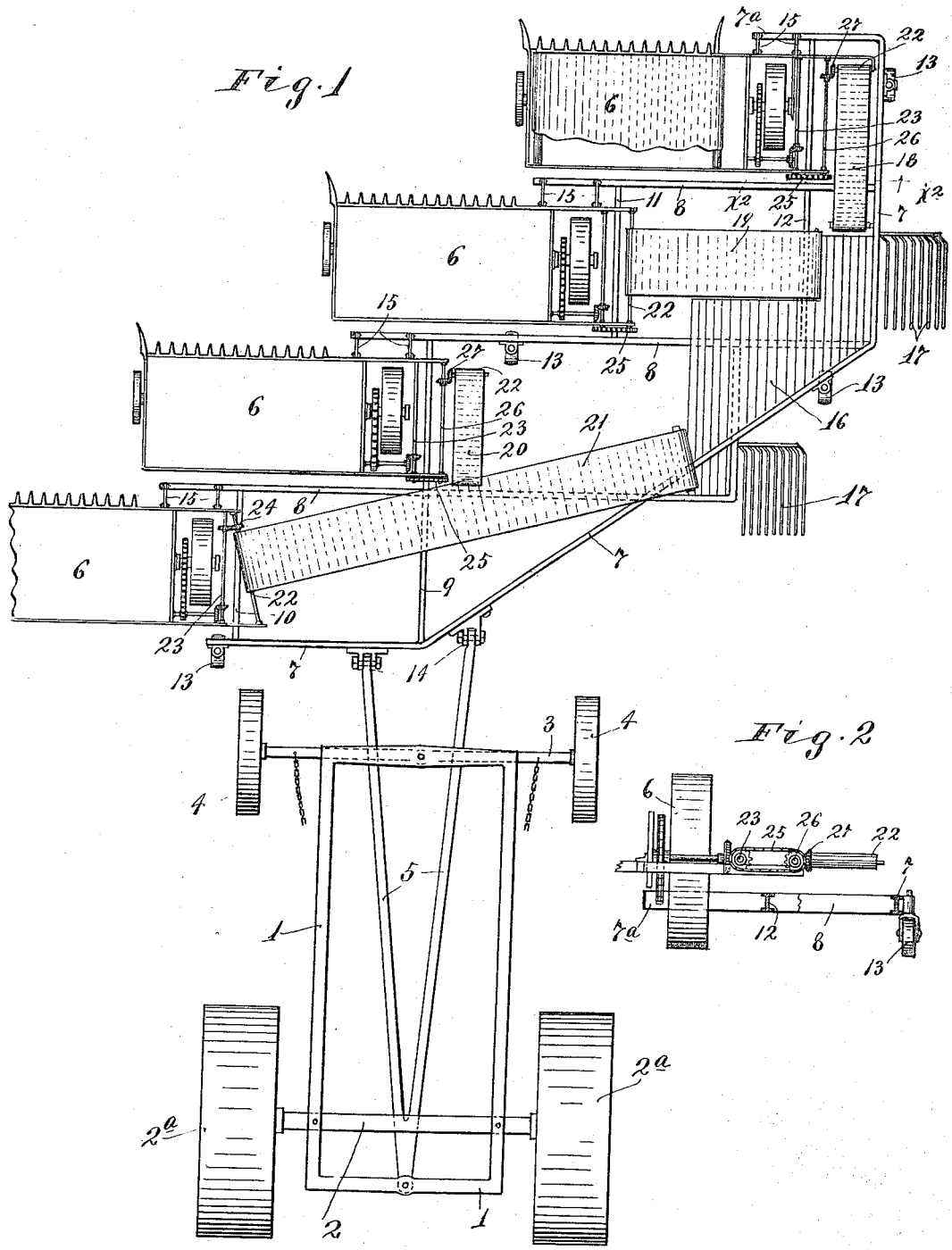

ALBERT H. SIEMEN, OF APPLETON, MINNESOTA.

GANG-FRAME ATTACHMENT FOR DRIVING HARVESTERS FROM TRACTION-ENGINES.

1,080,935.

Specification of Letters Patent.  Patented Dec. 9, 1913.

Application filed June 12, 1912. Serial No. 703,211.

*To all whom it may concern:*

Be it known that I, ALBERT H. SIEMEN, a citizen of the United States, residing at Appleton, in the county of Swift and State of Minnesota, have invented certain new and useful Improvements in Gang-Frame Attachments for Driving Harvesters from Traction-Engines; and I do hereby declare the following to be a full, clear, and exact description of the invention, such as will enable others skilled in the art to which it appertains to make and use the same.

My invention has for its object to provide an improved so-called gang frame attachment for coupling a plurality of harvesters together and for driving the same from a traction engine, and to such ends, the invention consists of the novel devices and combinations of devices hereinafter described and defined in the claims.

More particularly stated, my invention has for its object to provide a frame or attachment for traction engines which will couple together a plurality of self-binding harvesters, located one ahead of the other and offset laterally, so that the series will cut a very wide swath, and which will deliver the bound bundles to a platform or bundle carriers. For instance, the attachment illustrated is designed to couple together four harvesters, one ahead of the other with their cutting mechanism offset laterally so that they will cut a swath equal to the total capacity of the four machines, to-wit, four times the width of that cut by one machine. The harvesters are thus offset very much after the manner of plows of a gang plow. The tandem coupling frame or gang attachment is mounted on caster wheels and it is pivoted to the rear axle or rear portion of the traction engine, and the several harvesters are coupled to the said frame in such way that they are free to adapt themselves to the irregularities in the ground. The said harvesters are driven in the usual way by their own traction wheels and the traction engine is simply used to impart the advance movements to the harvesters and to keep the same coupled in proper coöperative relation in respect to each other.

In the accompanying drawings which illustrate the invention, like characters indicate like parts throughout the several views.

Referring to the drawings, Figure 1 is a diagrammatic view illustrating the invention; and Fig. 2 is a vertical section taken on the line $x^2$ $x^2$ on Fig. 1.

The traction engine may be of the usual or any suitable construction and of the parts thereof, it is only desirable for the purposes of this case to note the frame 1, the rear axle 2, rear traction wheels $2^a$, pivoted front or steering axle 3, and front wheels 4. A push bar 5, which, as shown, has forwardly projecting prongs, is pivotally connected at its rear end to the rear portion of the frame 1.

In the drawings, the four harvesters are indicated as entireties by the numeral 6. The construction and operation of these self-binding harvesters is well known, and detail description thereof is not desirable for the purpose of this case.

The so-called gang frame, as shown, is made up of a main bar 7, a plurality of transverse bars 8 and tie bars or braces 9, 10, 11 and 12. The front end of the main bar 7 is bent laterally toward the left to afford a transverse portion $7^a$. This frame is, as shown, supported on four caster wheels 13, three of which are shown as applied to the main bar 7, and one of which is shown as applied to the intermediate transverse bar 8. These four caster wheels are so disposed that they will support the said tandem frame for traveling movements in any direction. The rear portion of the main bar 7 is shown as connected to the front ends of the prongs of the push bar 5, by pivot joints 14 that permit independent rising and falling movements of the traction engine and of the said tandem frame. The front beams of the harvester frames are coupled, one to each of the transverse bars 8 and one to the transverse bar $7^a$ by parallel links 15, which cause the said harvesters to partake of the angular horizontal movements of the tandem frame, but permit the said harvesters to independently move vertically in respect to the said frame, to thereby adapt themselves to irregularities in the ground. It will thus be seen that the so-called tandem frame is pushed ahead by the traction engine, but that the harvesters are pulled from the said frame through the parallel links 15.

At its right hand portion, the so-called tandem frame is provided with an operator's platform 16 and, as shown, two shock carriers 17 are attached to the said frame, one at the right hand side and one at the rear of the said platform. These shock carriers may be of well known standard or any suitable construction.

The bundles from the four harvesters are delivered onto the common platform 16, by four endless conveyers 18, 19, 20 and 21. The conveyer 18 delivers the bundles from the front harvester onto the platform 16, the conveyer 19 delivers the bundles from the second harvester from the front onto the said platform 16, and conveyer 21 delivers the bundles from the rear harvester onto the said platform 16, and the conveyer 20 delivers the bundles from the harvester second from the rear onto the said conveyer 21, and by the latter, they are delivered onto the said platform 16. Conveyers 18, 19, 20 and 21 are adapted to run over suitable guide rollers on the tandem frame and on the frames of the harvesters, and each conveyer is adapted to be driven from the respective harvester in any suitable way, but, as shown, this is accomplished by roller-equipped shafts 22, journaled on the harvester frames and driven from one of the driven shafts 23 of the said harvester. The rear conveyer 21 extends oblique to the shaft 23 from which it is driven, and hence, is coupled thereto by intermeshing beveled gears 24. All of the other conveyers are driven from the corresponding shafts 23 through sprockets and chain drives 25, but the drives for the front and next to the rear conveyers also include a shaft 26 and intermeshing beveled gears 27.

In operating a rig of the character above described, one man of course, will control the single traction engine; one man on the platform 16 looks after the different sections of the harvesting machines, walking from one to the other on said platform where he can attend to the twine boxes, the oiling and like work; and two other men on the said platform standing, one near each shock carrier close to where the bundles drop, pick up the bundles, place them in shocks upon the shock carriers and when the shocks have been properly accumulated, trip the shock carrier and cause the proper deposit of the shocks along the line of travel. Shock carriers can be built the same or approximately the same as standard bundle carriers but larger. Thus it will be seen that four men may control the complete rig and do all the manual work connected therewith, and the bundles are deposited in shocks instead of being distributed along the line of travel and thereafter shocked. Hence, there is a very great saving in manual labor and economy is effected in the harvesting operation.

Of course, I do not limit myself to any particular number of harvesters thus connected and pushed from a single traction engine.

The steering of the gang frame and harvesters is accomplished by pushing the bar 5 forward and at the same time forcing its pivoted rear end laterally, much after the plan of pushing a two-wheel cart forward by its tongue. For instance, if the gang frame and harvesters are to be caused to turn toward the left, the traction engine will be turned slightly toward the right, while at the same time harvesting forward.

The so-called gang coupling frame is, of course, of quite large structure, and could not be hauled along an ordinary roadway or over ordinary bridges if pushed straight ahead, but when the harvesters are disconnected therefrom, it may be hitched behind a traction engine and drawn obliquely, that is, its longest dimension which is parallel to the oblique of its main bar 7, trails behind the engine. The caster wheels will permit this traveling action and when the frame is thus drawn, it will pass anywhere that the traction engine will go.

What I claim is:

1. The combination with a traction engine running gear and a push bar having its rear end pivotally connected to the rear portion of the frame thereof, of a gang coupling frame having connections to the front end of said push bar for lateral angular adjustments therewith, caster wheels supporting said frame, and a plurality of harvesters connected to said gang frame in offset arrangement, one ahead of the other.

2. The combination with a traction engine running gear and a push bar having its rear end pivotally connected to the rear portion of the frame thereof, of a gang coupling frame having connections to the front end of said push bar for lateral angular adjustments therewith, caster wheels supporting said frame, a plurality of harvesters connected to said gang frame in offset arrangement, one ahead of the other, the said traction gang frame having an operator's platform and conveyers delivering from the several harvesters to said platform, and a shock carrier attached to said gang frame adjacent to said operator's platform.

3. A traction gang frame of oblique elongated form having means for connecting a plurality of harvesters in offset arrangement one ahead of the other, said frame having supporting caster wheels adapting the said frame to be moved forward with the harvesters attached thereto and adapting the same to be moved in the direction of its oblique elongation, when the harvesters are disconnected therefrom.

4. A traction gang frame of oblique elongated form having means for connecting a plurality of harvesters in offset arrangement one ahead of the other, said frame having supporting caster wheels adapting the said frame to be moved forward with the harvesters attached thereto and adapting the same to be moved in the direction of its oblique elongation when the harvesters are disconnected therefrom, and a push bar pivotally connected to said gang frame and extended therefrom and adapted to be attached to a traction engine, substantially as described.

In testimony whereof I affix my signature in presence of two witnesses.

ALBERT H. SIEMEN.

Witnesses:
    LEWIS L. SIEMEN,
    P. E. O'CONNOR.